United States Patent [19]

Letson

[11] Patent Number: 5,715,985
[45] Date of Patent: Feb. 10, 1998

[54] AUTOMATIC NAILING MACHINE

[75] Inventor: Michael L. Letson, Prior Lake, Minn.

[73] Assignee: Viking Engineering & Development Incorporated, Fridley, Minn.

[21] Appl. No.: 695,936

[22] Filed: Aug. 12, 1996

[51] Int. Cl.$^6$ ........................................ B65H 5/00
[52] U.S. Cl. .................. 227/119; 227/129; 227/135; 227/138; 227/139
[58] Field of Search .................. 227/135, 138, 227/139, 107, 119, 120, 129

[56] References Cited

U.S. PATENT DOCUMENTS

| | | | |
|---|---|---|---|
| 3,526,743 | 9/1970 | Spisak | 221/68 |
| 4,327,652 | 5/1982 | Fletcher et al. | 227/119 |
| 4,651,657 | 3/1987 | Kennedy | 227/119 |
| 4,714,034 | 12/1987 | Riss et al. | 227/119 |
| 5,480,087 | 1/1996 | Young et al. | 227/119 |

Primary Examiner—Joseph J. Hail, III
Assistant Examiner—Jay A. Stelacone
Attorney, Agent, or Firm—Haugen and Nikolai, P.A.

[57] ABSTRACT

An apparatus for delivering fasteners, such as nails, screws and rivets from a supply source to an automatic fastener driver comprises an elongated flexible wire helix whose pitch is such that fasteners can be supported by their heads between adjacent convolutions. One end of the elongated helix is coupled to a vibratory bowl feeder that feeds individual fasteners in a desired order and orientation into a holding station. The opposite end of the wire helix is positioned over an inlet chute leading to a fastener holding chuck and the distal end of the helix is adapted to be driven through 360° by an indexing motor upon each actuation of the fastener driver. In this fashion, for each nail that is dropped from the distal end of the helix into the driver's inlet chute, another nail is picked up at the holding station and advanced in incremental steps along the length of the helix.

11 Claims, 3 Drawing Sheets

AUTOMATIC NAILING MACHINE

BACKGROUND OF THE INVENTION

I. Field of the Invention

This invention relates generally to apparatus for fabricating products wherein materials are to be joined by fasteners, such as nails, screws, and rivets, and more particularly to an apparatus for feeding fasteners from a supply pile thereof to the inlet of a power fastener driver.

II. Discussion of the Prior Art

When fabricating items out of wood, metal or plastics, separate parts are often connected together using common types of fasteners, such as nails, screws, rivets and the like. As an example, machines have been developed for facilitating manufacture of wooden pallets used in shipping various commodities. Such machines allow an operator to manually insert three 2×4 stringers of a precut length dimension into the machine where the stringers are in parallel, spaced-apart relationship with one on each side and one in the middle. The operator next positions transversely extending boards or slats, such as 1×6s, atop the stringers and then the unfastened assembly is transferred by the machine beneath a plurality of fastener drivers, such as nailing guns, which are used to drive nails through the transversely extending slats and into the stringers. The thus-formed partial assembly is then inverted and another set of transversely extending slats are positioned atop the longitudinally extending set of stringers, and this assembly is again fed to the nailing station where nails are driven by the pneumatic hammers through the cross-boards or slats into the now-sandwiched stringers, completing the pallet assembly.

A representative prior art pallet making machine is the "Champion" Model sold by Viking Engineering Development, Inc. of Fridley, Minn. In this machine, bulk nails are fed to the nailing guns through pneumatic tubes. That is, a blast of air is used to move nails much like a dart from a blow gun. This arrangement is both costly and subject to frequent jamming which necessitates machine shut-down and lost production.

Another nailing system offered by the Bostitch Corporation utilizes so-called "collated fasteners" in which, for example, individual nails are spot-welded at spaced intervals to a pair of wires that are then wound on reels. As such, the nails are fed to the nailing guns in much the same way that machine gun bullets are fed into the chamber of a machine gun. The cost of obtaining collated nails uniformly spaced and connected together in a long string by two fine wires greatly exceeds the cost of the corresponding number of loose or bulk nails. Therefore, significant economies can be achieved if it were possible to deliver individual nails from a pile thereof in single file order to the nailing guns and without jamming. For example, a typical reel of connected nails costs about three times as much as an equivalent number of loose, unconnected nails.

It is accordingly a principal object of the present invention to provide an improved mechanism for feeding loose, individual nails from a bulk supply to the inlet of automatic nailing guns at a rate compatible with the production rate of the machine on which the nailing guns are used.

SUMMARY OF THE INVENTION

The foregoing objects and advantages are achieved in accordance with the present invention by providing a fastener drive means which may comprise a powered nail driver for forcing a fastener (nail) into a work piece where the fastener drive means has a fastener inlet through which individual nails are fed into the chamber of the fastener driver. Located remote from the fastener driver itself is a fastener supply device which preferably comprises a vibratory feeder into which a supply of loose, individual nails can be poured. The vibratory supply device is used to serially supply individual nails in a predetermined orientation to a holding station which acts as a buffer for matching the feed rate of the supply device with the firing rate of the fastener drive gun. Completing the assembly is a fastener conveyor means that is coupled between the holding station and the inlet of the fastener drive means, and it functions to sequentially deliver individual fasteners to the fastener inlet in a serial order at a rate governed by the firing rate of the fastener driver. The conveyor means preferably comprises an elongated, wound, wire helix that is rotatably mounted between the holding station associated with the vibratory bowl feeder and the inlet of the fastener drive device. The wire helix is of a predetermined pitch less than the diameter of the nail heads, whereby the nails may be suspended by the head between adjacent convolutions of the wire helix. The wire helix is adapted to be driven by an indexing motor mounted to a stationary portion of the fastener drive means and each time the fastener driver is fired, the motor cycles and the helix is made to rotate through 360°, thereby receiving a new nail at the holding station proximate the vibratory bowl and at the same time dropping the endmost nail into the inlet of the fastener driver.

In a typical pallet manufacturing machine, multiple fastener drivers are employed to drive nails at three locations aligned with the longitudinally extending pallet stringers, and in this arrangement, three separate rotatable helix conveyor devices are journaled between the holding station associated with the vibratory bowl feeder and the indexing motors on the three individual guns.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
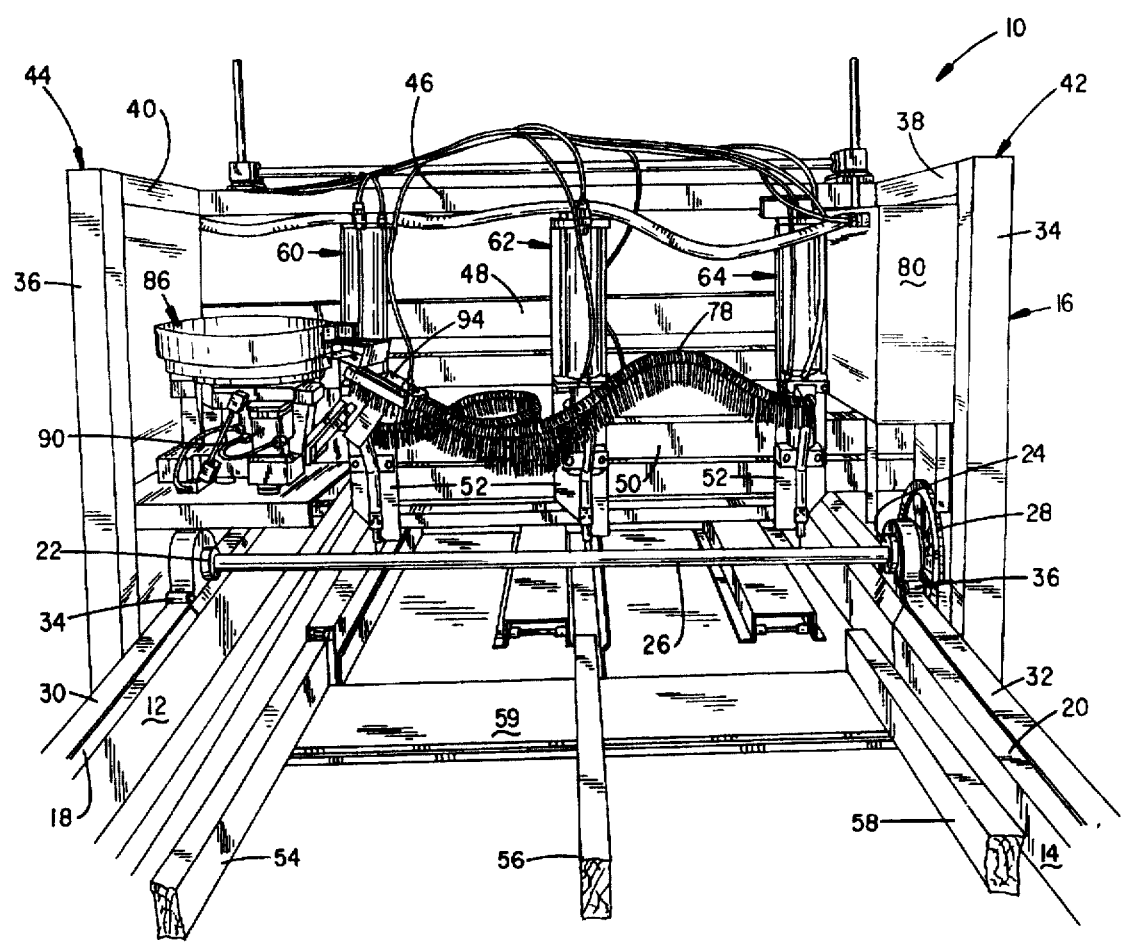
FIG. 1 is a perspective view of a portion of a pallet manufacturing machine and showing the manner in which individual loose nails are fed to a plurality of nailing guns.

Referring first to FIG. 1, there is indicated generally by numeral 10 a pallet manufacturing machine in which the nail feeding system of the present invention finds application. While the invention will be described in connection with its use on a pallet nailing machine, those skilled in the art will appreciate that the invention has significantly wider application and can be used wherever individual fasteners, such as nails, screws or rivets, are to be fed from a bulk supply into the chuck mechanism of a pneumatic, hydraulic or electric fastener driver.

The machine 10 is seen to comprise a floor-mounted frame including horizontally extending stationary frame members 12 and 14 which are oriented in parallel, spaced-apart disposition on opposite sides of the machine. The frame members 12 and 14 comprise steel rails of sufficient height and width to support a traveling frame assembly indicated generally by numeral 16 thereon. Resting atop each of the steel frame members 12 and 14 is an elongated gear rack 18 and 20 and cooperating with the two gear racks are associated pinion gears 22 and 24 that are affixed to a common shaft 26. The shaft 26 extends between the frame members 12 and 14 and their associated racks, 18 and 20, respectively. The shaft 26 is adapted to be driven by a chain drive coupled between a sprocket on a drive motor (not shown) mounted on the movable frame assembly 16 and a sprocket wheel 28 secured to the shaft 26. The shaft 26 is journaled for rotation in the movable frame assembly 16 and as it, along with the pinion gears 22 and 24 rotate, the movable frame assembly 16 "walks" along the gear racks 18 and 20. The gear teeth on the racks 18 and 20 are hidden from view in FIG. 1 by elongated leather or fabric straps 30 and 32 which are played over the pinion gears by routing rollers, as at 34 and 36. The leather belt prevents debris, such as wood splinters, nails, etc. from falling between the teeth in the rack and interfering with the mating pinion gear.

The movable frame member comprises upright structural members 34, 36, upper cross members 38 and 40, lower cross members (not shown) which are welded or otherwise rigidly attached to the vertical support members 34 and 36. Also not shown in the drawing of FIG. 1 are further vertical support members that extend parallel to the vertical support members 34 and 36 but at the far end of the machine (as viewed in FIG. 1) to which the upper cross members 38, 40 and the lower cross members attach to form parallel, spaced-apart side frame subassemblies. The two subframe side assemblies hereinafter identified by numerals 42 and 44 are joined at the far end of the machine by an upper transversely extending frame member 46 and a corresponding lower cross member (not shown). Extending transversely between the vertically extending frame members at the far end of the machine are intermediate steel cross members 48 and 50. Secured to these latter cross members are vertical mounting plates 52 that are generally aligned with channels into which the longitudinal wooden stringers 54, 56 and 58 of a pallet to be nailed are aligned.

Bolted or otherwise affixed to the mounting plates 52 are the fastener drivers which are indicated generally in FIG. 1 by numerals 60, 62 and 64. While the fastener drivers illustrated in FIGS. 1-3 of the drawings comprise power nailing machines, those skilled in the art will realize that the present invention can be applied to other types of fastener drivers. For example, rather than a nail driver having a cylinder for applying a driving force to the head of a nail for driving it into wooden pieces disposed beneath the driver, the driver may include a rotating chuck for advancing a threaded screw-type fastener into the underlying work pieces.

Figure 2:
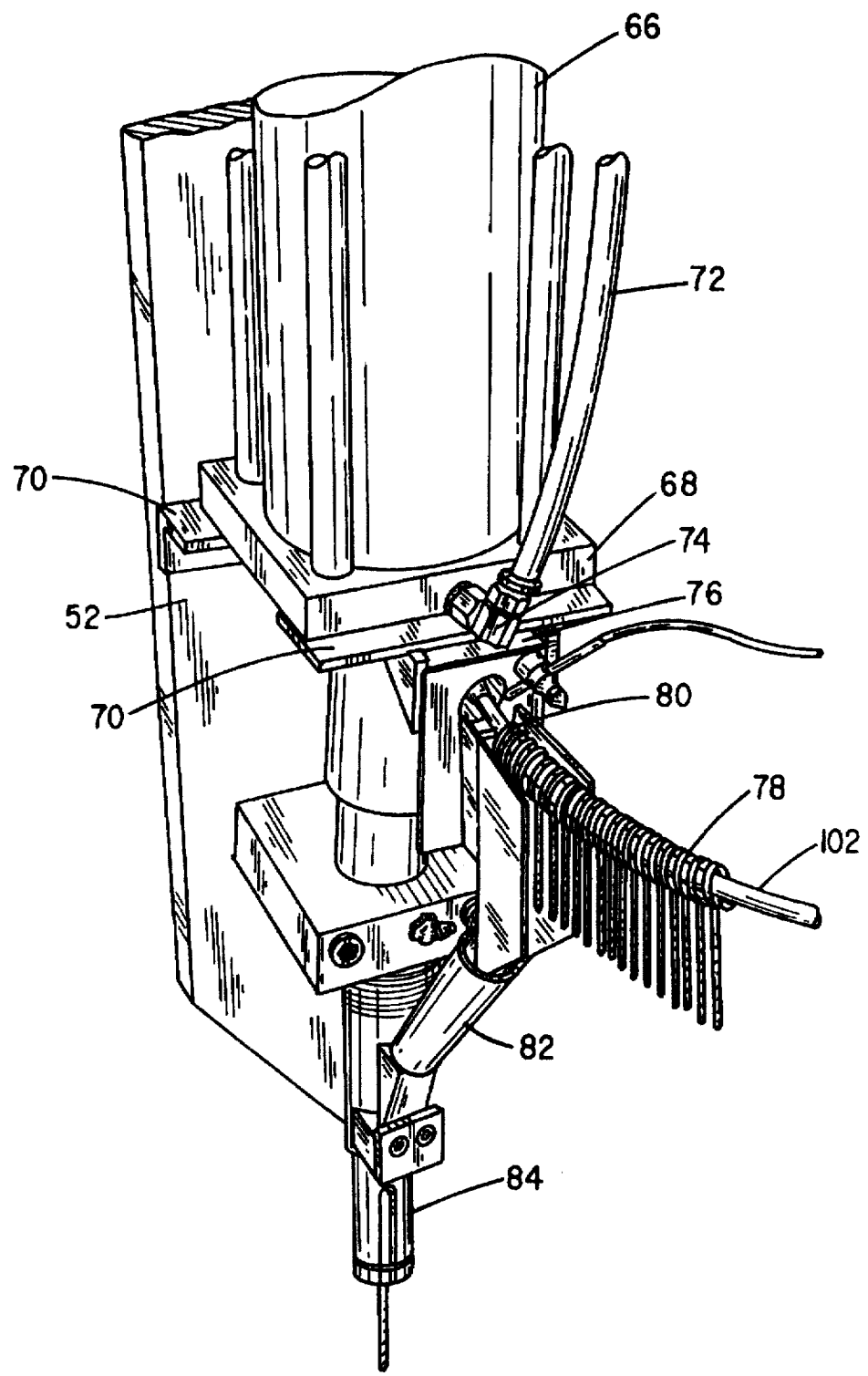
FIG. 2 is a close-up view of a typical nailing gun and showing a portion of the conveyor feeding the inlet of the gun.

Referring momentarily to FIG. 2, the nail driver is seen to include a pneumatic cylinder 66 mounted on a support plate 68 which spans between an angle bar 70 attached to mounting plate 52 and a bracket 71. Pressurized air can be supplied to the cylinder via hose 72 and a fitting 74 that is screwed into a bore formed in the plate 68 leading to the cylinder chamber of the pneumatic ram 66.

Also supported by the bracket 70 is an electric indexing motor 76 whose output shaft is connected in driving relation to an elongated wire helix 78. Electrical signals from a control panel 80 (FIG. 1) provide energization to the motor such that each time a nail is driven by actuation of a piston (not shown) disposed in the cylinder 66, the wire helix or spring 78 is made to revolve through a single revolution.

Located beneath the distal (discharge) end 81 of the wire helix 78 is an inlet chute 82 for guiding a nail released from the distal end of the helix into the nail chuck 84 following the firing of a preceding nail.

Figure 3:
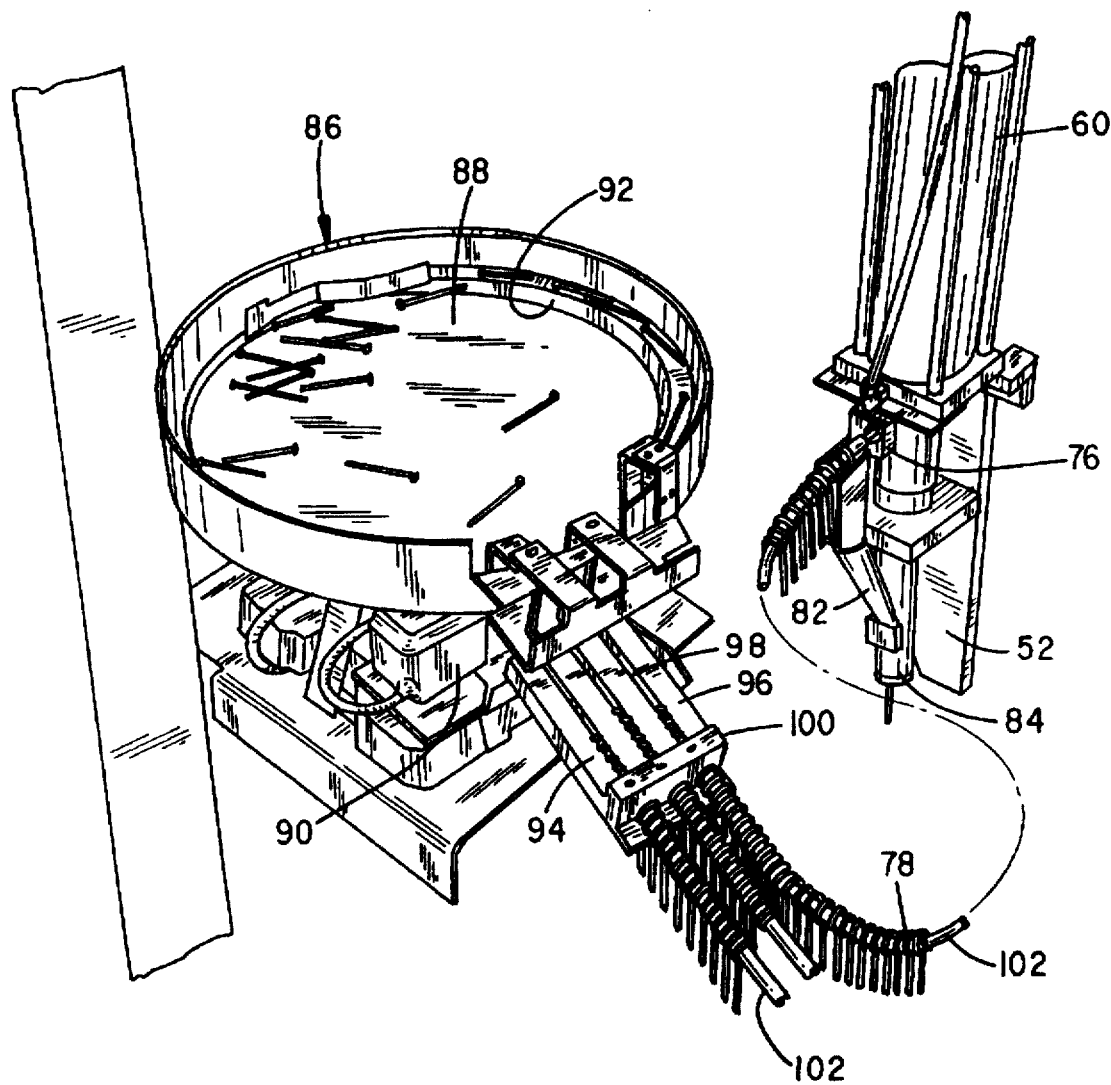
FIG. 3 is a partial view of the nail-feeding assembly of the present invention.

Referring next to FIGS. 1 and 3, the mechanism used to feed nails in single file include a vibratory bowl assembly 86 having a bowl 88 into which loose nails can be dumped periodically as the supply of nails in the bowl become depleted. Vibratory bowl conveyors are well known in the art. A commercially available model useful in implementing the present invention is sold by FMC Corporation of Homer City, Pa., under the trademark, SYNTRON. It includes an electrically driven vibrator mechanism 90 disposed beneath the bowl and a upwardly ascending ramp 92 formed along the interior peripheral wall of the bowl. Because of the vibratory motion imparted to the bowl, the individual nails tend to "climb" the ramp 92 and because of its narrow dimension, the individual nails either become generally longitudinally oriented on the shelf of the ramp or fall off of it back into the bowl. Thus, upon reaching the discharge end of the ramp 92, the nails are made to fall into a holding station 94 which comprises a plate that is also attached to the vibrating assembly 90. The holding station 94 includes a plate 96 having a plurality of longitudinal slots, as at 98, formed therein. The slots are of a width greater than the shank portion of the nail but smaller than the diameter of the nail's head. As such, upon falling into the slots 98, the nails are supported by their heads from the plate 96 comprising the holding station 94.

Affixed to the free end of the plate 96 is a journal member 100 for the proximal ends of the wire helices 78, shown in the drawings as being three in number.

As can best be seen in FIG. 1, the three individual, elongated wire helices lead individually to the three fastener drivers 60, 62 and 64. In FIG. 3, only fastener driver 60 is illustrated.

To provide a measure of support so as to prevent undue sagging of the wire helices in traversing the span between the holding station 94 and the individual fastener drivers 60, 62 and 64, it has proven expedient to place a flexible steel rod as at 102 through the central opening of the wire helix 78.

OPERATION

Having described the mechanical construction of the system incorporating the present invention, attention will next be given to its mode of operation.

The first step in the operation is for a human operator to manually load the longitudinal wooden stringers 54, 56 and 58 onto the nailing machine's bed and then load the slats as at 59 onto the upper surface of the stringers 54, 56 and 58. Once so loaded, the wooden stringers are clamped in a desired position and cross slats are advanced by a conveyor (not shown) until the members 54, 56 and 58 are transported to a reference or home position relative to the movable assembly 44. At this time, the operator presses a control button on the face of the control module 80 to fire a first set of nails from the guns 60, 62 and 64 through the lumber cross slats and into the longitudinal stringers 54, 56 and 58. The firing of the first set of nails causes an electrical drive signal to be sent to the motors 76 affixed to the mounting bracket 70 to rotate the wire helix 78 through 360°. This rotation causes the endmost nail suspended between adjacent turns or convolutions of the spring to release and fall through the chute 82 and into the nail chuck 84. At the same time, the rotation of the wire helices 78 causes the proximal end thereof to pick up the frontmost nails in the holding station 94 and suspend them by their heads between the adjacent convolutions closest to the journal members 100. In effect, each of the nails marches forward by a distance equal to the pitch of the helices, which distance is slightly less than the diameter of the nail heads employed, upon each revolution of the shaft of the indexing motors 76. Because the holding station 94 is affixed to the oscillation mechanism 90 of the vibratory bowl, the nails tend to be jiggled as they descend the slots 98 formed in the holding station plate 96 which enhances the transfer of the leadmost nails into the space between adjacent convolutions of the wire helices 78 as they are rotated.

Subsequent to the firing of each set of nails by the drivers 60, 62 and 64, the motor driving the shaft 26 through the chain-driven sprocket 28 causes the movable assembly 44 to translate a predetermined distance that is continually measured by a suitable linear encoder operatively connected between the movable frame and the stationary frame. Once the programmed position for the next set of nails is reached, the movable assembly 44 stops and the pneumatic solenoids associated with the drivers 60, 62 and 64 are actuated to drive the next set of nails through the lumber. Again, the firing of the nails initiates the indexing motors 74 associated with the individual nail drivers causing another 360° rotation of the wire helices, thereby dropping the next nails to be fired into the inlet chutes 82 leading to the nail chucks on those drivers. This sequence repeats until all of the cross slats of the pallet have been nailed to the underlying longitudinal stringers 54, 56 and 58. At this time, the partially completed pallet is inverted, end-for-end, and another set of transversely extending lumber slats are laid atop the stringers 54, 56 and 58 before the traveling assembly 44 carrying the nailing guns again traverses the pallet, automatically nailing the cross slats in place. Upon completion of the operation of nailing the cross slats to both sides of the stringers 54, 56 and 58, the finished pallet is dropped onto a further conveyor (not shown) and carried away to a stacking station.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. Apparatus for sequentially delivering fasteners from a bulk supply means to a fastener driver, comprising:

(a) a cyclicly operated powered fastener drive means for forcing a fastener into a work piece, said fastener drive means having a fastener inlet means for receiving fasteners therein one at a time;

(b) bulk fastener supply means located remote from the fastener drive means, the bulk fastener supply means feeding fasteners in serial order and with a predetermined orientation to a holding station;

(c) fastener conveyor means comprising a wire helix rotatably coupled between the holding station and the fastener inlet means; and (d) an indexing motor coupled in driving relation to the wire helix for turning the wire helix through a predetermined angle upon each cycle of operation of the powered fastener drive means, said wire helix receiving a fastener from the holding station and delivering a fastener to the fastener inlet means of the fastener drive means each time the wire helix rotates through said predetermined angle.

2. The apparatus as in claim 1 wherein the fasteners are nails and the fastener drive means is a powered nail driver.

3. The apparatus as in claim 2 wherein said nail driver operates with an intermittent reciprocating vertical stroke between an upper nail loading position and a lower nail inserting position.

4. The apparatus as in claim 3 wherein said indexing motor is disposed proximate the nail driver.

5. The apparatus as in claim 1 wherein the fastener supply means comprises a vibratory bowl feeder containing a plurality of fasteners in random order and a ramp of a predetermined narrow width for receiving fasteners and advancing them with a desired orientation to the holding station.

6. The apparatus as in claim 5 wherein the fasteners are nails having a pointed end and an opposite end with a head, the holding station supporting the nails in a vertical orientation by the head.

7. The apparatus as in claim 5 wherein the holding station is connected to the vibratory bowl feeder whereby the holding station is made to vibrate.

8. The apparatus as in claim 6 wherein the wire helix has a predetermined pitch which is less than a diameter of the head of the nail, whereby a nail is supportable by the head between adjacent convolutions of the wire helix.

9. The apparatus of claim 1 and further including a stiffening means extending through a central opening of the wire helix.

10. The apparatus as in claim 9 wherein the fastener is a nail and the fastener drive means is a cyclicly operated powered nail driver.

11. The apparatus as in claim 10 wherein the wire helix is of a predetermined pitch less than a diameter of a head of the nail whereby a nail is supportable by the head between adjacent convolutions of the wire helix.

\* \* \* \* \*